United States Patent
Au et al.

(10) Patent No.: US 7,567,704 B2
(45) Date of Patent: Jul. 28, 2009

(54) METHOD AND APPARATUS FOR IDENTIFYING PHYSICAL FEATURES IN VIDEO

(75) Inventors: Kwong Wing Au, Bloomington, MN (US); Michael E. Bazakos, Bloomington, MN (US); Yunqian Ma, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 811 days.

(21) Appl. No.: 11/289,886

(22) Filed: Nov. 30, 2005

(65) Prior Publication Data

US 2007/0122040 A1 May 31, 2007

(51) Int. Cl.
  G06K 9/00 (2006.01)
  G06K 9/62 (2006.01)
  G01C 3/00 (2006.01)
  G01C 5/00 (2006.01)
  G01B 11/24 (2006.01)
  G01B 11/30 (2006.01)
  H04N 7/18 (2006.01)
  H04N 9/47 (2006.01)
  H04N 5/232 (2006.01)

(52) U.S. Cl. .......................... 382/154; 382/106; 382/165; 382/224; 356/3; 356/609; 348/135; 348/140; 348/211.9

(58) Field of Classification Search .................. 382/106, 382/154, 165, 224–228; 356/3, 609; 348/135, 348/140, 211.9
See application file for complete search history.

(56) References Cited

U.S. PATENT DOCUMENTS

| | | | |
|---|---|---|---|
| 6,549,661 B1* | 4/2003 | Mitsuyama et al. | 382/224 |
| 2002/0118883 A1* | 8/2002 | Bhatt | 382/224 |
| 2007/0019865 A1* | 1/2007 | Owechko et al. | 382/224 |
| 2008/0298679 A1* | 12/2008 | DeLuca et al. | 382/167 |
| 2009/0010495 A1* | 1/2009 | Schamp et al. | 382/106 |

* cited by examiner

*Primary Examiner*—Brian P Werner
*Assistant Examiner*—Randolph Chu
(74) *Attorney, Agent, or Firm*—Kris T. Fredrick

(57) ABSTRACT

An image is processed by a sensed-feature-based classifier to generate a list of objects assigned to classes. The most prominent objects (those objects whose classification is most likely reliable) are selected for range estimation and interpolation. Based on the range estimation and interpolation, the sensed features are converted to physical features for each object. Next, that subset of objects is then run through a physical-feature-based classifier that re-classifies the objects. Next, the objects and their range estimates are re-run through the processes of range estimation and interpolation, sensed-feature-to-physical-feature conversion, and physical-feature-based classification iteratively to continuously increase the reliability of the classification as well as the range estimation. The iterations are halted when the reliability reaches a predetermined confidence threshold. In a preferred embodiment, a next subset of objects having the next highest prominence in the same image is selected and the entire iterative process is repeated. This set of iterations will include evaluation of both of the first and second subsets of objects. The process can be repeated until all objects have been classified.

25 Claims, 2 Drawing Sheets

METHOD AND APPARATUS FOR IDENTIFYING PHYSICAL FEATURES IN VIDEO

FIELD OF THE INVENTION

The invention pertains to the estimation of ranges to pixels and the automated identification (calculation) of physical features in video images.

BACKGROUND OF THE INVENTION

Due to advances in video processing technology as well as the general increase in processing power available for a given cost and size, software is now available that is intended to examine live or recorded video and automatically recognize physical features in the video and determine the nature of objects appearing in the video, e.g., a car, an animal, a building, a human, etc. One well-publicized use of such technology is for automated recognition of individuals in video surveillance cameras by facial or other features. This technology, for instance, could be useful for automatically recognizing known terrorists or detecting abnormal or unusual activities and behaviors of people, vehicles and other objects of interest in airports and other public venues.

Another application of this technology is automatic target acquisition and surveillance in military operations.

The latest generation of automated video surveillance software has extended the technology to more than simply recognizing physical features, but also interpreting temporal qualities associated with those physical features (i.e., from frame to frame of the video) to recognize patterns of behaviors, events, and activities as well.

Techniques for classifying an object in a video sequence rely on information that can readily be gathered from an image or a sequence of images (i.e., a sequence of frames of a digital video) such as color, color continuity, size (e.g., number of pixels), motion, direction of motion, speed of motion, shape, etc. Naturally, information as to the distance between the camera and the object, i.e., range, would be extremely useful in algorithms for classifying detected objects because it would help in determining certain parameters such as speed and size that would be much more difficult to determine without range information.

For instance, a particular object might be identified by its contrast in hue relative to the background. Such an object may consume 25 pixels of the image and therefore have a size of 25 pixels. However, the sensed feature of the number of pixels occupied by the object provides essentially no information as to the actual physical size of the object unless the range to the object is known. For instance, an object that occupies 25 pixels within an image may correspond to the size of a car if the car is 100 meters from the camera. However, 25 pixels might also correspond to the size of a cat if the cat is 15 meters from the camera. A similar problem exists with respect to estimating the speed of an object. Obviously, a distant object moves more slowly through an image than an object moving at the same speed but closer to the camera.

Accordingly, some techniques have been developed for helping to determine or estimate the range of objects under surveillance. Such techniques include laser ranging, in which a laser range-finder is mounted very close to the camera to bounce a light beam off of objects in the surveillance area and measure the round trip delay in order to physically measuring the distance between the camera and the objects. Another known technique for determining range is stereo imaging. In stereo imaging two (or more) cameras observe the same surveillance volume from slightly different perspectives. The two (or more) simultaneous images of the same volume obtained from the cameras can be compared to each other and the range to the various objects in the images can be determined by triangulation.

A third technique, called passive ranging, can be used in connection with objects that are moving through the area under surveillance. Particularly, if the speed of a moving object is known or estimated, then its range can be estimated from the number of pixels by which it moves over a sequence of frames. For instance, if an object is moving perfectly sideways through the surveillance area and its speed is known, then the range can be calculated from the number of pixels it moves over a known time period (i.e., a known number of frames). Likewise, if an object is moving straight towards or straight away from the camera over a sequence of frames, its speed can be estimated by its change in size, particularly if the size of the object is known or estimated. Through more complex algorithms, it may be possible to accurately estimate range even with respect to objects whose size is not known and/or that have oblique motion through the surveillance area. However, generally, such factors as oblique motion and lack of knowledge as to size make the estimate much less reliable.

Accordingly, passive ranging generally is much less reliable and less accurate than laser ranging and triangulation in stereo imaging. Further, it can only be applied to moving objects (and then not particularly accurately if the speed, size, and/or direction of motion is not well known or predicted). A variation of this method is when the camera is moving at a known speed such as mounted on a vehicle (car, aircraft, boat, etc.). The optical flow can then be calculated and passive ranging to any point in the scene can be estimated.

Laser ranging and triangulation in stereo imaging, while been relatively accurate and reliable, is expensive. In laser ranging, a laser range finder must be supplied for every camera. In stereo imaging, there must be twice as many cameras. In addition, establishing stereo correspondence, for example, through dynamic programming, requires intense computations. Furthermore, retrofitting pre-existing video surveillance systems for laser ranging or stereo imaging is extremely labor-intensive.

Techniques for classifying objects in video can generally be characterized as falling into one of two types of techniques, namely: (1) sensed-feature-based classification and (2) physical-feature-based classification. Sensed-feature-based classification is based strictly on information that uses pixel as the measurement unit, e.g., pixel/frame, in an image or series of images, whereas physical-feature-based classification is based on information measured in physical standard or metric units, such as known or estimated speed, size or range in, for example, feet/sec, square meter, or meter, respectively. Thus, for instance, a sensed-feature-based classification algorithm might disclose that the size of an object in the image is 25 pixels. However, a physical-feature-based classification would indicate that the object is 2 feet tall.

It is an object of the present invention to provide a new and improved technique for estimating ranges to pixels and identifying and/or classifying objects of interest in video surveillance.

SUMMARY OF THE INVENTION

In accordance with the principles of the invention, a digital image is segmented into regions, which are processed by a sensed-feature-based classifier to generate a list of classified objects, i.e., objects assigned to classes. The most prominent objects (those objects whose classification is most reliable) are selected for range estimation and interpolation. Based on the range estimation and interpolation, for each object, the sensed features are converted to physical features (e.g., a size or distance expressed as a number of pixels is converted to a size or distance expressed in inches). Next, that subset of objects is run through a physical-feature-based classifier that re-classifies the objects.

Next, the subset of objects and the range estimates are re-run through the three processes of range estimation and interpolation, sensed-feature-to-physical-feature conversion, and physical-feature-based classification iteratively to continuously increase the accuracy and reliability of the classification as well as the range estimation. The process is completed when the accuracy and/or reliability estimate has reached a certain threshold, e.g. in the form of a probabilistic confidence measure In a preferred embodiment, a next subset of objects having the next highest prominence in the image is selected and the entire process is repeated iteratively until a certain reliability threshold is attained. This set of iterations will include evaluation of both the first and second subsets of objects. The process can be repeated until all objects have been classified.

Additional subsets of objects can be selected until a lower prominence threshold is reached or until all identified objects have been processed.

In an even further embodiment of the invention, when this process is completed, a next frame of video can be obtained and the process repeated for that frame. Range estimates from previous frame can be re-used in the case of a stationary camera scenario. Knowledge that an object in two or more frames is the same object can be used to even further increase accuracy and reliability. However, correlation of objects from frame to frame is not necessary.

DETAILED DESCRIPTION OF THE INVENTION

The present invention is a method and apparatus for processing image data in order to recognize and identify objects within an image, including multiple-frame video images. The key aspects of the present invention focus on the technique for classifying objects, either moving or stationary, and determining their range. The invention can be implemented through software loaded on a computing device, such as a microprocessor, processor, or PC. It can be embodied within a video surveillance system or separately connected to a video surveillance system. Alternately, the invention can be implemented by any other reasonable means including an application specific integrated circuit (ASIC), digital hardware, or any combination of the aforementioned.

Figure 1:
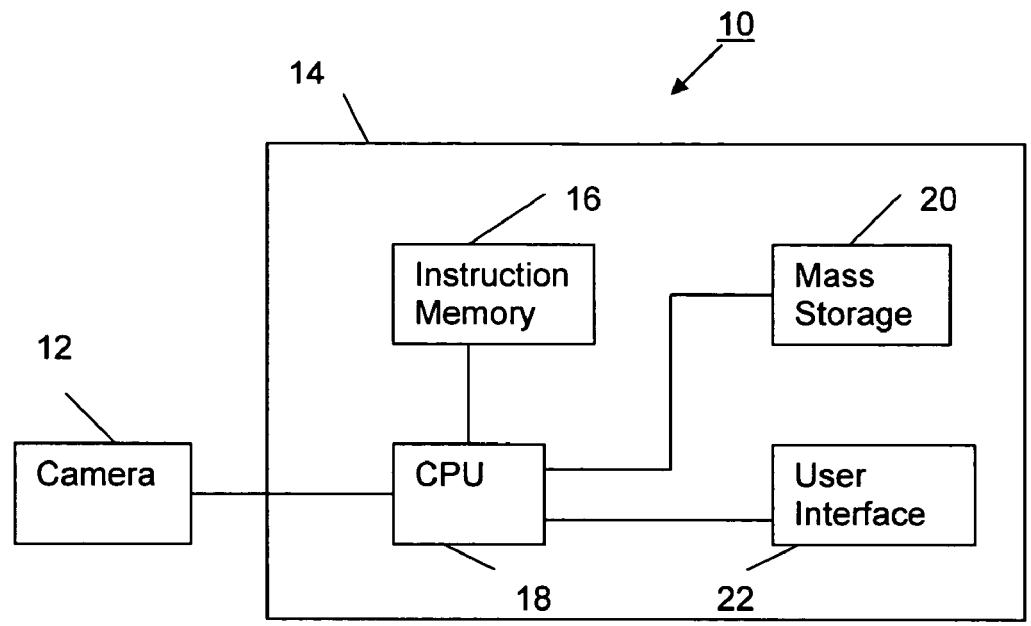
FIG. 1 is a block diagram illustrating a processor within which the present invention may be implemented.

FIG. 1 is a block diagram showing the major components of a video surveillance system 10 within which the present invention is incorporated. The system comprises one or more cameras 12 that output digital images of one or more surveillance areas. The camera 12 sends a video feed to a processing system 18. Processing system 18 includes an instruction memory 16 for storing and providing software instructions to a central processing unit 18 for execution. The central processing unit 118 operates on the digital data stream from the camera 12 in accordance with these instructions so as to analyze the incoming images to produce useful results (such as target acquisition or recognition of known terrorists). The processor 18 further includes a mass storage device 20, such as a hard disk, for storing the video images and/or the output information. In addition, there is a user interface 22 so that an operator may interact with the system. For instance the user interface typically may comprise a computer monitor, keyboard, and/or computer mouse device.

In a preferred embodiment, the invention is implemented in software. However, this is not a limitation of the invention and the invention can be implemented in any reasonable fashion, including firmware, hardware, software, or combinations of any or all of the above.

Figure 2:
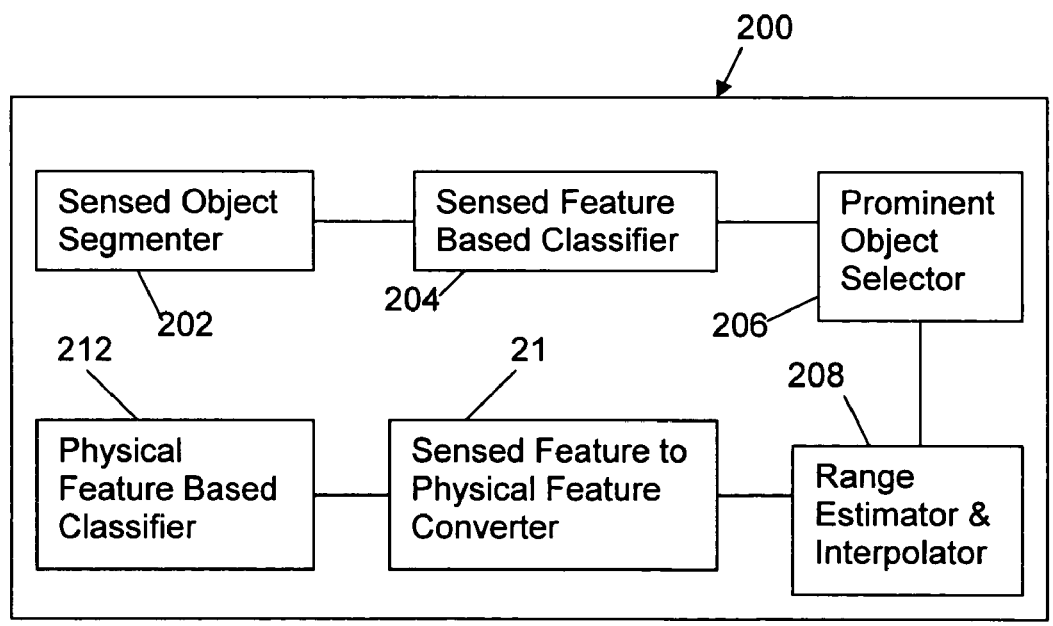
FIG. 2 is a block diagram illustrating the software components comprising the present invention.

FIG. 2 is a block diagram showing the basic software components of the present invention. For illustrative purposes, the invention can be considered to be comprised of the six relatively distinct functionalities illustrated in FIG. 2. However, it should be understood that the compartmentalization of the software 200 into six distinct functionalities is merely for purposes of helping simplify the explanation of the invention and that, in an actual implementation, the software need not be compartmentalized in any physical or theoretical sense. The same would be true for other implementations of the invention, including hardware and firmware implementations.

Nevertheless, referring to FIG. 2, an image is first sent to a sensed object segmenter 202 that analyzes the image and detects and defines distinct objects within the image. The segmenter 202, however, does not yet have or generate any information as to the nature of the objects, e.g., cars, planes, buildings, trees, humans, animals, etc., but only that they appear to be distinct objects from each other (and the background). The information about the distinct objects in the image is then processed by a sensed-feature-based classifier 204. The sensed-feature-based classifier 204 classifies the one or more objects based on the sensed feature information (e.g., number of pixels, color, shading, etc.) without reference to any physical information. The list of classified objects and associated information, including, but not limited to, each object's class, is then fed to a prominent object selector 206. The prominent object selector 206 analyzes the data about each classified object and makes a prediction as to the reliability of the classification of each object.

As will be explained in more detail below, and particularly in connection with FIG. 3, a range estimator and interpolator 208 then takes the information pertaining to one or more of the most reliably predicted objects and attempts to predict the range of the objects from the camera. Next, the object information, now including range predictions, is processed by a sensed-feature-to-physical-feature converter 210. This component converts sensed-feature information (e.g. number of pixels occupied by an object and the shape of the object) to physical features (e.g., height, width, depth in meters) based, for instance, on assumptions about the class of the object, e.g., a typical human is about 6 feet tall.

The final block is a physical-feature-based classifier 212. The physical-feature-based classifier 212 takes the object information, which now includes physical information instead of or in addition to the sensed feature information, and runs them through an algorithm to attempt to classify the objects based on the physical feature information in an attempt to improve the classification prediction made by the sense-feature-based classifier 204.

In accordance with the principles of the present invention, the objects and their classification and other information generated by the physical-feature-based classifier 212 is then returned to the range estimator and interpolator 208 to be processed again based on the new, presumably more accurate, classifications made by the physical-feature-based classifier 212. The objects are run through the range estimator and interpolator 208, sensed-feature-to-physical-feature based converted 210, and physical-feature-based classifier 212 iteratively to improve the classification prediction reliability incrementally.

The invention will now be described in connection with FIG. 3, which is a flow diagram illustrating the sequence of processing an image or plurality of images in accordance with one particular embodiment of the present invention.

The invention relies on the circular premises that the accuracy and reliability of physical-feature-based classification is improved by having more reliable range information, whereas, the accuracy and reliability of the range estimation is improved by having more reliable object classification.

Figure 3:
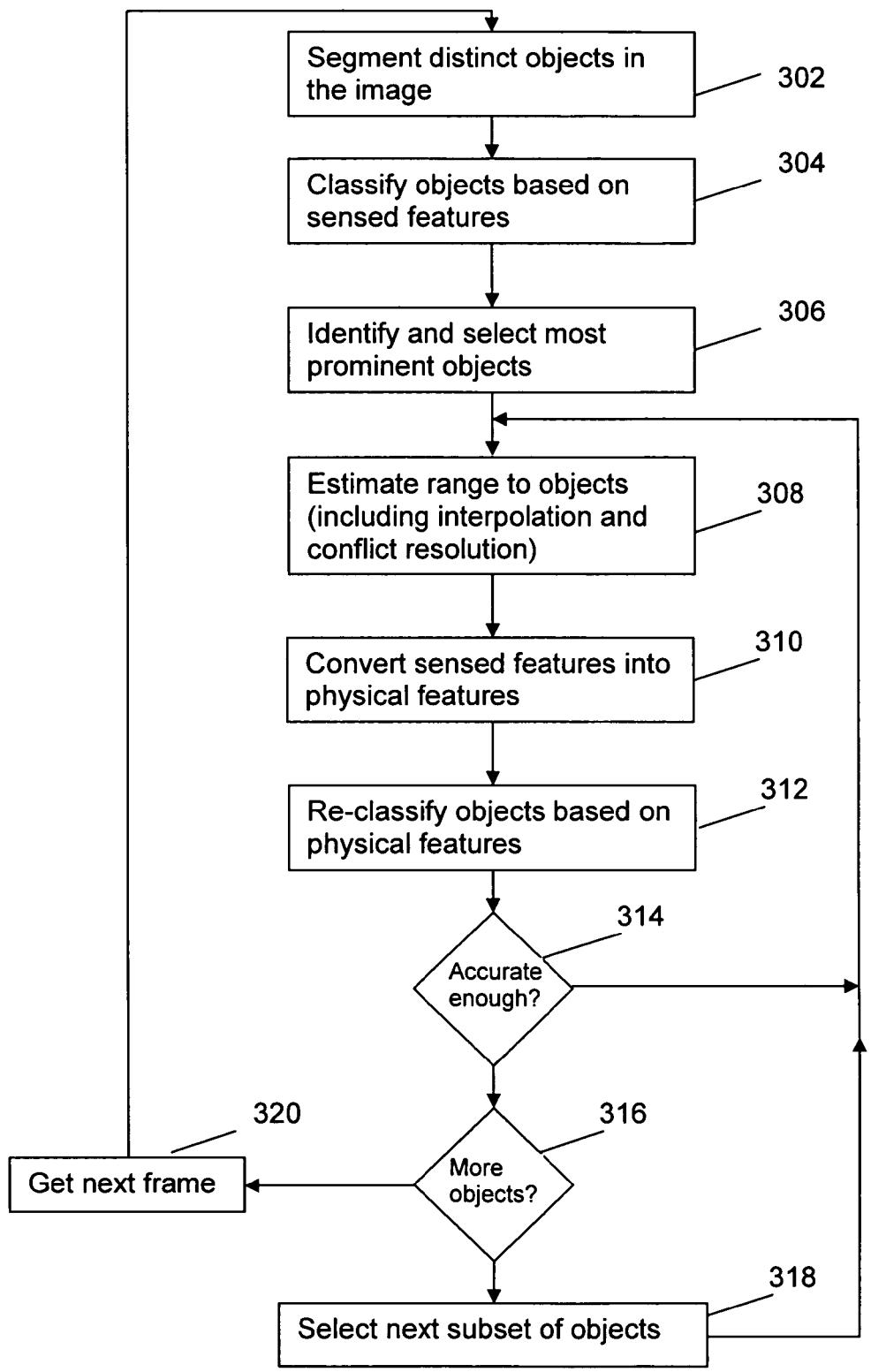
FIG. 3 is a flow diagram illustrating the present invention in accordance with one particular embodiment thereof.

FIG. 3 illustrates the process in connection with a single video feed from a single camera. However, it will be understood by those skilled in the art that the invention can be applied to a video surveillance system comprising any number of cameras.

The first step upon receipt of a digital video image from a camera is step 302, in which the image is analyzed to segment a number of distinct objects in the image, which, for example, may be cars, people, animals, trees, buildings, etc., but only the fact that they are distinct objects from each other. No information is yet generated as to the class of the objects, e.g., car, plane, building, human, animal, etc. Software algorithms for segmentation and listing distinct objects in a video image are known and need not be described in further detail herein. The list of objects so determined is then analyzed and processed in step 304 to make a sensed-feature-based classification of each object in the list. Again, software algorithms for classifying objects based on sensed features in video images are known. The invention can be implemented using any known sensed feature-based classification algorithm, such as neural networks, support vector machines, Bayesian classifiers, etc.

The list of classified objects is then processed in step 306 by the prominent object selector to estimate the reliability of the sensed feature based classification of each object. The prominent object selector orders the objects from most reliably predicted classification to least reliably predicted classification and outputs a subset of the most reliably predicted objects.

The prominent object selector is new technology. It determines the reliability of the class prediction made by the sensed-feature-based classifier based on predetermined criteria. One criterion may be the classification confidence. In general, the classification result not only provides the object classification, but also a confidence measure ranging from 0 to 1. The most prominent objects can be chosen based on the confidence measure. That means the higher the confidence measure, the more prominent the object. Another possible prominent object selection criterion may be based on types of classified objects. Often, a classifier is more capable of classifying certain types of objects better than others. For example, one particular sensed-feature-based classifier may classify a vehicle correctly with 90% probability, whereas it classifies a human correctly with only 70% probability. In this example, the objects that are classified as vehicles may be selected first. Yet another selection criterion may be based on the location of the object in the image. Objects that are at closer range generally provide more details and thus tend to be more accurately classified. In the case of a forward looking video camera, closer objects appear at the bottom of an image. Hence, near objects, which are located at the bottom of the image, are preferred.

In a preferred embodiment of the invention, the highest rated selection criterion is based on tracked objects, when available. For instance, if the same object, the classification and physical features of which are known from previous computations, appears and is being tracked in a current frame, this object may be given the highest prominence rating. A combination of these criteria, formulated as rules, can be used for the prominent object selection.

The objects are then ordered in a list from most likely reliable classification to least likely reliable classification. Then, in step 306, a subset of the most reliably predicted objects is selected. Depending on the particular embodiment, one may select the single most reliably predicted object or a set of the most reliably predicted objects, e.g. the five most reliably predicted objects.

In step 308, range estimation and interpolation is then performed with respect to all of the objects in the subset of classified objects to generate a list of classified objects including range predictions for each object.

Range estimation and interpolation is well known in the art. In short, it predicts the range from the camera to objects based on intrinsic camera calibration (such as focal length and resolution), the sensed feature information and, particularly, the classification made by the sensed-feature-based classifier. In addition, it is often possible to reasonably predict the range to other objects or to other points in an image by interpolation between two or more points on the object or in the image whose range has already been estimated based on the sensed features and/or sensed-feature-based classification.

Conflict resolution also is performed in step 308. Particularly, errors in the sensed-feature-based classification can produce range estimates that can be readily identified as incorrect or probably incorrect. For example, an object at the top of the image may have a shorter range estimate than an object at the bottom of the image. As previously noted, this very likely is an error since objects at the top of an image obtained by a forward-looking camera are highly likely to be farther away that objects at the bottom of the image. A conflict resolution algorithm can identify objects having range estimates that are probably or clearly erroneous and replace the range estimates for those objects with new range estimates using interpolation and the iterative estimation process.

Now having the sensed-feature-based classification and a predicted range for one or more of the objects in the image, in step 310, the sensed features are converted to physical features (i.e., the relative measurements, such as number of pixels, are converted to physical measurements, such as meters) by the sensed-feature-to-physical-feature converter. Sensed-feature-to-physical-feature conversion usually is simply a matter of proportional transformation and any conventional technique for proportional transformation may be employed herein.

At this point, a subset of classified objects exists having defined (predicted) physical features. This information is then run through a physical-feature-based classifier (step 312). Such classifiers, of course, are well-known in the art and any such conventional software can be used. For example, the physical-feature-based classification algorithm can be a neural network, a support vector machine, or a Bayesian classifier as in the sensed-feature-based classifier (except that the input classification information is measured in physical units, rather than pixels). In one embodiment of the invention, the physical-feature-based classifier gives no credence or weight to the sensed-feature-based classification, but instead makes its classification prediction based on the range estimation data and the physical feature data for each object. Preferably, if the physical-feature-based classifier makes a prediction that classifies a given object in a different class than the sensed-feature-based classifier, the physical-feature-based classification is used. After the physical-feature-based classification is performed, a subset of objects with data defining their physical features and revised (potentially) classifications exists.

These objects are then run through the steps of range estimation and interpolation (step 308), sensed-feature-to-physical-feature conversion (step 310), and physical-feature-based classification (step 312) iteratively to continually improve both the classification and range predictions. This iterative process is based on the aforementioned circular reasoning that range estimation reliability is improved by having better classification reliability and that classification reliability is improved by having better range estimation reliability.

Accordingly, the next step, step 314, is a decision step in which a decision is made as to whether the predictions are accurate enough. In a simply embodiment of the invention, this decision may be based strictly on a predetermined number of iterations through steps 308, 310, and 312 having been conducted. Alternately, software similar to the prominent object selector can be used to predict the accuracy of the classification and/or range estimation and, if one or both exceed a predetermined threshold with respect to all of the objects in the subset, the iterative process can be stopped. Accordingly, if, in step 314, it is determined that the prediction is not accurate enough, flow branches back to step 308. On the other hand, when sufficient accuracy is obtained, flow branches to step 316.

Step 316 is another decision step and is an optional step. Particularly, in step 316, the software determines whether there are more objects identified by the object segmentation whose classification and range are to be predicted. This step is considered optional because it may not be necessary depending on the implementation details of the overall algorithm. For instance, it may be desirable to predict the range and/or classification of only the 5 or 10 most prominent objects in the image. In one potential implementation of the invention, the iterative process may be run on a subset consisting of all 5 or 10 of those objects. However, in another potential implementation, the software may run the iterative process on a smaller subset of the objects and then go back, in step 316, and get the next group or subset of objects and run them through the iterative process. Accordingly, in step 316, if there are more objects to be predicted, flow proceeds to step 318, in which the next subset of objects are selected. Flow then proceeds from step 318 back to the range estimation and interpolation step 308 so that the next subset of objects can be run iteratively through steps 308, 310, and 312.

In a preferred embodiment of the invention, the next subset of objects selected in step 318 are the next most prominent objects as determined in the prominent object selection step 306. Merely as an example, in one embodiment of the invention, the iterative process may be run on a subset of five objects at a time. However, this is merely one example and the possibilities are essentially endless.

In a preferred embodiment of the invention, when the second or subsequent subset of objects are selected in step 318, the range estimation and interpolation (step 308), sensed-feature-to-physical-feature conversion (step 310), and physical-feature-based classification (step 312) is performed, not just on the second or subsequent subset of objects, but also on all preceding subsets of objects. Thus, for instance, in an embodiment in which five objects are taken at a time, when the second subset of five objects are selected in step 318, the iterative process is repeated with respect to the ten most prominent objects (i.e., the five newly selected objects as well as the five most prominent objects which had already been run through the iterative process of steps 308, 310, and 312).

Of course, in an alternative embodiment, the range and classification predictions made with respect to the first five objects may be left untouched and the process performed only for the new subset of objects.

Returning to decision step 316, if there are no more objects to be selected, flow instead proceeds to step 320 instead of step 318. Step 320 also is an optional step. In step 320, a next frame or image is obtained. Step 320 is optional at least because, in some embodiments of the invention, there may be only one image to process.

Flow then proceeds from step 320 back to step 302 so that the entire process can be repeated with respect to the next frame or image. In a preferred embodiment of the invention, the range estimates from previous computations are reused in the next frame. This is particularly applicable when the video camera is stationary. In such cases, steps 304, 306 and 308 can be skipped.

It should often be possible to determine whether a particular identified object in one frame is the same as an object identified in another frame with respect to at least some of the objects. If it is known (or at least predicted) that a particular object in particular frame is the same as a particular object in a preceding frame, this information can be used in the sensed-feature-based classifier, prominent object selector, range estimator and interpolator, sensed feature to physical feature converter, and physical-feature-phase classifier to further improve the accuracy of the range and classification predictions. On the other hand, no information continuity between the frames is necessary for the invention to operate.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A method of classifying objects and estimating ranges in an image, said method comprising: using a processor to perform steps of:
    (1) segmenting at least one distinct object within said image;
    (2) classifying said at least one object based on sensed features of said at least one object;
    (3) predicting a range of said at least one object based on its classification;
    (4) converting sensed features of said at least one object to predicted physical features of said at least one object;
    (5) classifying said at least one object based on said physical features of said at least one object and said predicted range; and
    (6) after step (5), repeating steps (3), (4), and (5) at least once with respect to said at least one object.

2. The method of claim 1 wherein said method further comprises the step of:
    (7) selecting a first subset of said objects for processing in accordance with steps (3), (4), and (5) based on the reliability of said sensed feature based classification.

3. The method of claim 2 wherein said first subset of objects comprises the at least one object having the most reliable classification.

4. The method of claim 3 wherein said first subset of objects comprises a plurality of objects.

5. The method of claim 3 wherein said image comprises digital data defining said image.

6. The method of claim 3 wherein step (6) comprises repeating steps (3), (4), and (5) until said classifications of said objects reaches a predetermined reliability threshold.

7. The method of claim 3 further comprising the steps of:
(8) subsequent to step (5), selecting a second subset of objects;
(9) predicting range for each of said objects in said second subset of objects;
(10) converting sensed features of each of said objects in said second subset of objects to predicted physical features of each of said objects in said second subset of objects;
(11) classifying each of said objects in said second subset of objects based on said physical features of each of said objects in said second subset of objects; and
(12) after step (11), repeating steps (9), (10), and (11) at least once with respect to said second subset of objects.

8. The method of claim 7 wherein steps (9), (10), (11), and (12) are performed with respect to said first and second subsets of objects.

9. The method of claim 8 wherein step (12) comprises repeating steps (3), (4), and (5) until said classification of said objects reaches a predetermined reliability threshold.

10. The method of claim 7 further comprising the steps of:
(13) receiving a second image; and
(14) performing steps (1)-(6) with respect to said second image.

11. The method of claim 10 further comprising the step of:
(15) repeating steps (8)-(12) with respect to said second image.

12. An apparatus classifying objects in an image comprising:
means for identifying at least one distinct object within said image;
means for classifying said at least one object based on sensed features of said at least one object;
means for predicting a range of said at least one object;
means for converting sensed features of said at least one object to predicted physical features of said at least one object;
means for classifying said at least one object based on said physical features of said at least one object and said predicted range; and
means for iteratively running said at least one object through said means for predicting, said means for converting sensed features, and said means for classifying based on physical features.

13. The apparatus of claim 12 further comprising:
means for selecting a first subset of said objects based on the reliability of said sensed feature based classification; and
wherein said at least one object comprises said first subset of objects.

14. The apparatus of claim 13 wherein said first subset of objects comprises the at least one object having the most reliable classification.

15. The apparatus of claim 14 wherein said at least one object comprises a plurality of objects.

16. The apparatus of claim 14 wherein said image comprises digital data defining said image.

17. The apparatus of claim 14 further comprising:
means for determining a reliability of said classifications of said objects; and
means for halting the iterative process upon said reliability reaching a predetermined threshold.

18. The apparatus of claim 14 further comprising:
means for selecting a second subset of objects comprising the next most reliably predicted at least one object in said image;
means for predicting range for each of said objects in said second subset of objects;
means for converting sensed features of each of said objects in said second subset of objects to predicted physical features of each of said objects in said second subset of objects;
means for classifying each of said objects in said second subset of objects based on said physical features of each of said objects in said second subset of objects; and
means for iteratively running said second subset of objects through said means for predicting, said means for converting sensed features, and said means for classifying based on physical features.

19. The apparatus of claim 18 wherein said means for iteratively running said second subset of objects runs said first and second subsets of objects through said means for predicting, said means for converting sensed features, and said means for classifying based on physical features.

20. A computer readable product embodied on computer readable media readable by a computing device for classifying objects in an image, the product comprising:
first computer executable instructions that identify distinct objects within said image;
second computer executable instructions that classify said at least one object based on sensed features of said object;
third computer executable instructions that predict a range of said at least one object;
fourth computer executable instructions that convert sensed features of said at least one object to predicted physical features of said at least one object;
fifth computer executable instructions that classify said at least one object based on said physical features of said at least one object and said predicted range; and
sixth computer executable instructions that iteratively running said at least one object through said third, fourth, and fifth computer executable instructions.

21. The computer readable product of claim 20 further comprising:
seventh computer executable instructions that select a first subset of said objects based on the reliability of said sensed feature based classification, and wherein said at least one object comprises said first subset of objects.

22. The computer readable product of claim 21 wherein said first subset of objects comprises the at least one object having the most reliable classification.

23. The computer readable product of claim 22 further comprising:
eighth computer executable instructions that determine a reliability of said classifications of said objects; and
ninth computer executable instructions that halt the iterative process upon said reliability reaching a predetermined threshold.

24. The computer readable product of claim 22 further comprising:
tenth computer executable instructions that select a second subset of objects comprising the next most reliably predicted at least one object in said image;

eleventh computer executable instructions that predict range for each of said objects in said second subset of objects;

twelfth computer executable instructions that convert sensed features of each of said objects in said second subset of objects to predicted physical features of each of said objects in said second subset of objects;

thirteenth computer executable instructions that classify each of said objects in said second subset of objects based on said physical features of each of said objects in said second subset of objects; and fourteenth computer executable instructions that iteratively run said second subset of objects through said eleventh, twelfth, and thirteenth set of instructions.

25. The computer readable product of claim 24 wherein said fourteenth computer executable instructions runs said first and second subsets of objects through said eleventh, twelfth, and thirteenth set of instructions.

* * * * *